United States Patent Office 3,455,561
Patented July 15, 1969

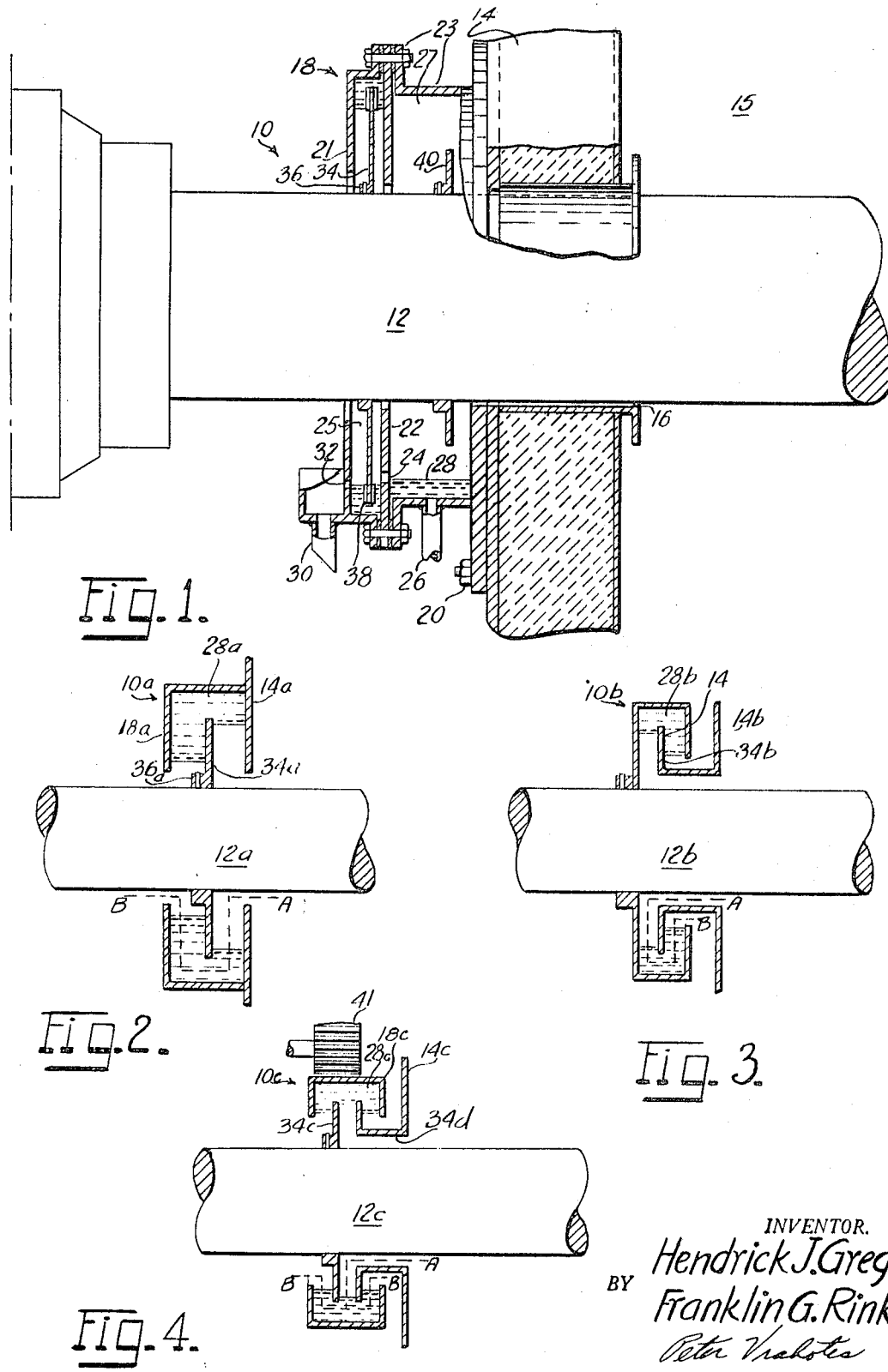

3,455,561
CENTRIFUGAL LIQUID SEAL
Franklin G. Rinker, Toledo, Ohio, and Hendrick J. Gregg, Arlington Heights, Ill., assignors to Midland-Ross Corporation, Toledo, Ohio, a corporation of Ohio
Filed Nov. 3, 1966, Ser. No. 591,851
Int. Cl. F16j 15/42, 15/44, 15/54
U.S. Cl. 277—13                                            2 Claims

ABSTRACT OF THE DISCLOSURE

A seal structure is provided for sealing the space between a rotating member and a stationary member. The seal contains a liquid to which a centrifugal force is applied that causes the liquid to circumvent the rotating member. A seal skirt is received within the liquid and prohibits an exchange of atmospheres. A means is provided for controlling the level of liquid supplied to the seal.

This invention relates to an apparatus for sealing the space between two members, one of which may rotate, oscillate, or reciprocate with respect to the other.

In many situations it is necessary to provide a seal between two members, one of which has motion relative to the other. Whenever the plane of the seal is in a generally horizontal position, no major problems arise as there are many existing designs which utilize a fluid such as water, oil, or any other suitable fluid. Whenever the plane of the seal must assume a generally vertical position, however, these fluid seals are no longer adequate, and are replaced by other designs. Examples of apparatus that require seals in a generally vertical position are fan assemblies with a horizontal drive shaft, wherein the impeller of the fan circulates atmosphere within a gas tight chamber; rotary kilns, wherein the kiln rotates relative to an adjacent feed mechanism; and high temperature pressurized reactor vessel wherein the seal between the vessel and the connecting equipment is subjected to both thermal expansion of the vessel as well as differential movement due to pressure within the apparatus. Many of these existing vertical seals are relatively expensive, unreliable and in certain instances have been the source of high maintenance cost. This invention is directed to all combinations requiring a seal, particularly a vertical seal, but for the purpose of illustration, the seal of this invention will be described as it is used in a fan assembly.

In some applications utilizing a fan for circulation of gases within a chamber, it is important to prevent the infiltration of air into, or the escape of gases from, the chamber. Such fans are generally referred to as being "gas-tight," although, there is usually some leakage occurring in the region where the impeller drive shaft extends through the fan housing. Whenever small amounts of leakage can be tolerated, it has been common practice to simply depend upon close clearances between the shaft and fan housing to effect a suitable seal. Such seals are commonly referred to as shaft seals and may also employ one or more labyrinth rings to further reduce leakage to within acceptable limits. When handling toxic or combustible gases, however, safety requirements make it imperative to prevent the infiltration of air or the escape of gases through the shaft seal In these applications additional means must be provided for introducing an inert gas directly into the seal under sufficiently high pressure to cause the inert gas to flow both into the chamber and out into the air.

The problem of maintaining an adequate shaft seal becomes even more acute when the fan is required to handle hot and/or dirty gases. Under these conditions thermal expansion of the housing usually occurs, and may possibly cause sufficient distortion to cause rubbing and eventual wearing of the close fitting seal parts. In addition, impeller unbalance can occur through erosion of the fan blades or accumulation of foreign deposits on the blades by the particles carried by the gas stream. This unbalance condition will cause subsequent vibration and may ultimately lead to destruction of the shaft seal.

Under these extreme operating conditions, maintenance of the shaft seal becomes of vital importance, particularly when such maintenance requires the equipment to be shut down for extended periods. For example, in certain heat treating applications the repair of a shaft seal can entail a loss of production for a period of many days, when it is necessary to cool down a furnace before starting repair and then reheating the furnace again to operating temperature after the repairs are completed.

It is, therefore, an object of this invention to provide a novel seal.

It is another object of this invention to provide a reliable and low maintenance gas seal.

It is a further object of this invention to provide a seal between two members that have motion with respect to one another.

It is still another object of this invention ot provide a seal between two members that move relative to one another, which seal may assume a vertical position.

It is a still further object of this invention to provide a novel method for sealing gases with a column of liquid.

It has been found that a highly effective seal can be attained by rotating a body of liquid in an annular vessel, or trough, at a sufficiently high speed to form a "ring of liquid" within the trough, and emersing projections extending from the ends of the members to be sealed into the rotating liquid. Furthermore, by rotating the liquid at speeds sufficient to develop centrifugal forces of several times the weight of the liquid, it is possible to seal a chamber under pressure or vacuum with smaller liquid differentials than heretofore possible.

The features of this invention as set out above, as well as other features both from the standpoint of the principles involved and the apparatus for carrying these principles into effect, will be apparent from the following description and accompanying drawings wherein:

FIG. 1 is a view partially in section and partially in elevation of a portion of a fan assembly having a seal that illustrates one of the embodiments of this invention.

FIGS. 2, 3 and 4 are sectional views of three seals that demonstrate various embodimeints of this invention in a fundamental manner.

Referring now to the drawing, a liquid seal generally shown at 10 provides means for preventing the flow of gases through, i.e., sealing the space between a rotating shown at 10 provides means for preventing the flow of ga member 12 and a stationary member 14. In this embodiment, the stationary member 14 is a housing that encloses a chamber 15 and has an opening 16 therein through which the rotating member 12 is received. Disposed about the rotating member 12 is an annular vessel generally shown at 18 which is securely attached to the stationary member 14 as by bolts shown at 20. The annular vessel 18 has a side wall 21, a peripheral wall 23 bolted to the side wall and a radially extending partition 22 therein which contains an opening 24 at the lower end thereof. The partition 22 separates the annular vessel 18 into two compartments 25 and 27. A liquid supply line 26 is attached to the lower portion of the peripheral wall 23 and supplies a liquid 28, such as water, to the compartment 27. The liquid 28 enters the compartment 25 through the opening 24 in the partition 22. Attached to the side wall 21 is a water outlet 30 which communicates with compartment 25 through an opening 32 in the side wall 21. Located within compartment 25 and disposed about the rotating member 12 is a radially extending annular seal skirt 34. The seal skirt 34 is rotatably carried by the rotating member and is sealingly attached thereto by an air tight joint 36. Disposed about the outside perimeter of the seal skirt 34 on an axial side thereof is means for roughening the surface thereof, which in this embodiment is a plurality of circumferentially spaced blades 38. The blades 38 and the outer perimeter of the skirt 34 are received within the water 28 located in chamber 25. A second ring member, or slinger 40, is attached to and carried by the rotating shaft in close proximity of the housing opening 16. This slinger 40 is provided to prevent any water from splashing into the opening 16 during starting or stopping of the rotating member 12.

In operation, water 28 is introduced into the bottom of the compartment 27 by the liquid supply line 26. The water level rises until it overflows opening 24 in partition 22, then the water 28 starts to fill compartment 25 until the level reaches opening 32 in the side wall 21 of annular vessel 18 where it is discharged through the water outlet 30.

This arrangement of water supply 26, openings 24 and 32 and outlet 30 maintains a fixed water level in the compartments 25 and 27. The rotating member 12, which in this embodiment is rotated by means of a drive mechanism (not shown) causing the shaft 12 and seal skirt 34 to rotate through the water 28 thereby creating a centrifugal force that causes the water to be carried around the periphery of compartment 25 at a speed that depends upon the relative roughness and wetted surface areas of the seal skirt 34 and compartment 25. As the water 28 begins to rotate within compartment 25 there is a temparary drop in liquid level until the quantity of incoming water 28 passing through the opening 24 is equal to the volume required to obtain the predetermined level about the entire perimeter of the compartment 25, after which the water 28 again overflows the opening 32 in the side wall 21 of the annular trough 18 and is discharged through water outlet 30. By shutting off the water supply prior to the stopping of the shaft 12 and by properly designing the opening 32 in the side wall 21 of the annular trough 18, it is possible to minimize the amount of water 28 spilled when the forces creating the seal are discountinued.

In applications involving a horizontally mounted shaft 12, the water 28 will be caused to rotate in an essentially vertical plane. In this case the rotational speed of the water 28 must be sufficiently great to develop a centrifugal force which is greater than the weight of the water to insure that the water 28 will not fall from the upper portion of the compartment 25 when it is vertically over the shaft 12. For example, referring to FIG. 1, and assuming the inside diameter of the rotating ring of water is 12 inches, it will be necessary to impart a rotational speed of about 77 revolutions per minute (r.p.m.) in order to meet the above requirements. This rotational speed will be constant regardless of the type of liquid used because the criteria here is the ratio of the centrifugal force exerted on the liquid as compared to its weight. When the centrifugal force exerted on a mass equals the weight of the mass then it is under the influence of one "G force." Obviously, when the liquid of this embodiment is at the top its rotation it must have a G force acting upward of at least 1.0 G's to balance the weight of the liquid, or the liquid will fall away from the outer peripheral wall 23.

Although the seal skirt in the above embodiment can be made to impart a centrifugal force to the water sufficient to maintain a rotating ring of liquid, it is sometimes desirable to increase the rotational speed of the water still further. One method of increasing the rotational speed of the water 28 is by increasing the roughness of the seal skirt 34 or by adding blades 38. Increasing the rotational speed of the water is desirable when attempting to seal large pressure differentials with a relatively small differential in liquid level across the seal. For example, suppose it is desired to pressurize the gas inside the fan chamber in the previous example to a pressure of 8 ounces per square inch in the area of the shaft 12. Normally, to offset this pressure, a water seal having a differential of approximately 14 inches of water would be required across the seal skirt 34; however, by increasing the roational speed of the water from 77 r.p.m. to about 245 r.p.m., the centrifugal force acting on the water will create a G force of ten. The differential required to withstand the 8 ounces per square inch of gas pressure will then be 1.4 inches of water. Similarly, if the G force were increased to one hundred (770 r.p.m.) the water differential required would be reduced to $0.01 \times 14 = 0.14$ inch of water. Thus, by utilizing this principle, it is possible to seal against pressure differentials limited only by the strength of the members as well as size and speed of the apparatus. While the amount of roughness required is quite difficult to predict, it usually is determined by trial and error for each application, and as one becomes more skilled in the art, the amount of trial and error can be reduced accordingly. It is extremely important, however, that care be exercised whenever employing paddles or other equivalent roughening devices to prevent cavitation of the liquid and thus cause the loss of the seal.

Although the centrifugal force is a function of the roughness of the member creating this force, it is also affected by the condition of the inner perimeter of the compartment 25. If the wetted perimeter of compartment 25 is rough, it would set up frictional forces that must be overcome in order to produce a net G-force of at least 1.0. It is therefore obvious that the compartment that receives the rotating water should be as smooth as possible. Thus, the speed of the water being rotated may be increased by providing roughening means to the rotating means and/or polishing the inside surfaces of the compartment 25.

Referring now to FIGURES 2, 3 and 4, wherein like numerals are used for like parts, various embodiments in a rather fundamental method are shown. In FIG. 2 the liquid seal is very similar to that shown in FIG. 1. However, the invention is reduced to its barest essentials. In the embodiment shown in FIG. 2 the rotating member 12a is disposed within the stationary member 14a and has disposed about it a seal skirt 34a that is secured by a sealed joint 36a. An annular vessel 18a is attached to the stationary member 14a and disposed about the rotating member 12a, the annular vessel having only one chamber therein within which water 28a is disposed. The seal skirt 34a imparts a centrifugal force to the water 28a as it is rotatably carried by the rotating member 12a. As this centrifugal force is imparted to the water 28a a liquid ring is disposed about the annular vessel 18a preventing an exchange of atmosphere between the spaces that lie on either side of the rotating member 12a as indicated at A and B. Note in this particular figure the difference in the water level on the two sides of the seal skirt 34a. This indicates that the gas pressure A existing within the stationary member 14a on one side of the seal skirt 34a is higher than the pressure B on the other side of the seal skirt 34a. As was explained previously, this differential may be reduced by the increased rotational speed of the rotating member 12a and/or by increasing the roughness of the seal skirt 34a and/or the smoothness of the inside perimeter of the annular vessel 18a.

In FIG. 3 the annular vessel 18b is attached to the rotating member 12b and the seal skirt 34b is connected to the stationary member 14b. In this particular embodiment the centrifugal force is supplied by the annular vessel 18b which is rotatably carried by the rotating member 12b. Again a pressure differential is shown between the spaces separated by the seal 10b wherein the gas pressure A within the stationary member 14b is higher than the gas pressure B on the outside of the seal. To increase the centrifugal force to the water 28b rotating within the vessel 18b, the rotational speed of the shaft 12b may be increased or the roughness of the inner perimeter of the annular vessel 18b may be increased and thus achieve a greater centrifugal force through increased rotational speed of the water as was discussed previously.

It would be advantageous in the embodiment shown in FIG. 3 to have the seal skirt 34b that is attached to the stationary member 14b as smooth as possible so as to decrease the frictional drag between that member and the rotating water.

Referring now to FIG. 4 the annular vessel 18c is disposed independently about the member 12c, which has extending therefrom a seal skirt 34c while the stationary member 14c has a seal skirt 34d.

In this embodiment the liquid 28c is rotated by some external means such as by spinning the annular vessel 18c with an idler gear 41 driven by a motor (not shown) while the member 12c is free to rotate, oscillate or reciprocate relative to the member 14c.

Referring to FIG. 4, the stationary members 34c and 34d should be as smooth as possible to reduce the frictional drag on the rotating liquid 28c while that of the inside surface of the annular vessel 18c should be roughened. In summation, those members which are to impart a centrifugal force to the liquid should probably be roughened in some manner; in addition, those members that have motion other than rotary motion, as for example when the shaft 12c oscillates, should also have their surfaces polished. In short, if a member does not impart a centrifugal force to the water 28a–28c then it is preferable to have the surface of that member smooth.

As will be evident to those skilled in the art, the invention herein described can also be employed in other embodiments and various modifications can be made to the illustrated embodiments without departing from the spirit or scope of the invention as defined by the following claims.

We claim:

1. A seal structure for sealing the space between a rotating member and a stationary member, said stationary member having an opening therein through which said rotating member is received, said seal structure comprising: an annular, trough-like vessel disposed about the rotating member and sealingly secured to the stationary member, a radially extending wall separating said vessel into two compartments and having an opening located on the lower portion of said wall providing communication between said compartments, a radial skirt secured to the rotating member and received within one of said compartments, said radial skirt extending radially beyond the opening in said wall, means for supplying a liquid to the other of said compartments and means on said vessel for controlling the level of said liquid in said compartments.

2. The seal structure of claim 1 wherein said rotating member has an annular slinger attached thereto, said slinger being located in the compartment in close proximity of the stationary member, and said skirt has a plurality of roughening structures located at the outer extent thereof.

References Cited

UNITED STATES PATENTS

| | | | |
|---|---|---|---|
| 773,297 | 10/1904 | Nash | 277—14 |
| 2,241,970 | 5/1941 | Thompson | 277—13 X |
| 2,573,425 | 10/1951 | Fletcher | 277—13 |
| 2,643,141 | 6/1953 | Bryant | 277 13 X |
| 2,834,618 | 5/1958 | Wiltse | 277—14 |
| 1,760,463 | 5/1930 | Abenanti | 277—67 |

FOREIGN PATENTS

| | | |
|---|---|---|
| 656,713 | 8/1951 | Great Britain. |
| 680,045 | 10/1952 | Great Britain. |

SAMUEL ROTHBERG, Primary Examiner

U.S. Cl X.R.

277—14, 67